(12) United States Patent
Assayag et al.

(10) Patent No.: US 9,591,349 B2
(45) Date of Patent: Mar. 7, 2017

(54) INTERACTIVE BINOCULAR VIDEO DISPLAY

(71) Applicant: Intel Corporation, Santa Clara, CA (US)

(72) Inventors: Michel Assayag, Shoham (IL); Shahar Taite, Kfar Saba (IL); Moshe Wasserblat, Maccabim (IL); Tomer Rider, Naahryia (IL); Oren Pereg, Amikam (IL); Alexander Sivak, Haifa (IL)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 14/581,548

(22) Filed: Dec. 23, 2014

(65) Prior Publication Data

US 2016/0182940 A1 Jun. 23, 2016

(51) Int. Cl.
| | |
|---|---|
| *H04N 21/431* | (2011.01) |
| *H04N 21/258* | (2011.01) |
| *H04N 21/45* | (2011.01) |
| *H04N 21/414* | (2011.01) |
| *H04N 21/61* | (2011.01) |
| *H04N 21/81* | (2011.01) |
| *H04N 21/4223* | (2011.01) |

(Continued)

(52) U.S. Cl.
CPC ... *H04N 21/4312* (2013.01); *H04N 21/25841* (2013.01); *H04N 21/41407* (2013.01); *H04N 21/4223* (2013.01); *H04N 21/4524* (2013.01); *H04N 21/4722* (2013.01); *H04N 21/6131* (2013.01); *H04N 21/6181* (2013.01); *H04N 21/6582* (2013.01); *H04N 21/8133* (2013.01)

(58) Field of Classification Search
CPC .......................................... H04N 21/00–21/99
See application file for complete search history.

(56) References Cited

U.S. PATENT DOCUMENTS

| | | | |
|---|---|---|---|
| 8,902,315 B2 | 12/2014 | Fisher et al. | |
| 2005/0113135 A1* | 5/2005 | Goebel | H04M 1/0208 455/556.1 |

(Continued)

OTHER PUBLICATIONS

"International Application Serial No. PCT/US2015/063168, International Search Report mailed Mar. 15, 2016", 3 pgs.

(Continued)

*Primary Examiner* — Sean Motsinger
(74) *Attorney, Agent, or Firm* — Schwegman Lundberg & Woessner, P.A.

(57) ABSTRACT

Various systems and methods for providing a repositionable video display on a mobile device, to emulate the effect of user-controlled binoculars, are described herein. In one example, one or more high resolution video sources (such as UltraHD video cameras) obtain video that is wirelessly broadcasted to mobile devices. The mobile device processes the broadcast based on the approximate location of the spectator's mobile device, relative to a scene within the field of view of the mobile device. The location of the mobile device may be derived from a combination of network monitoring, camera inputs, object recognition, and the like. Accordingly, the spectator can obtain a virtual magnification of a scene from an external video source displayed on the spectator's mobile device.

23 Claims, 8 Drawing Sheets

(51) Int. Cl.
*H04N 21/4722* (2011.01)
*H04N 21/658* (2011.01)

(56) References Cited

U.S. PATENT DOCUMENTS

| | | | |
|---|---|---|---|
| 2006/0174297 A1* | 8/2006 | Anderson | G02B 27/017 725/100 |
| 2007/0109324 A1 | 5/2007 | Lin | |
| 2008/0147730 A1* | 6/2008 | Lee | G06Q 30/0212 |
| 2010/0026809 A1* | 2/2010 | Curry | H04N 5/222 348/157 |
| 2011/0018997 A1* | 1/2011 | Ortiz | A63B 71/06 348/143 |
| 2011/0074926 A1 | 3/2011 | Khan et al. | |
| 2012/0156983 A1* | 6/2012 | Ortiz | H04N 7/17318 455/3.06 |
| 2012/0206565 A1 | 8/2012 | Villmer | |
| 2012/0242798 A1* | 9/2012 | McArdle | H04N 21/23412 348/46 |
| 2012/0244907 A1 | 9/2012 | Athsani et al. | |
| 2012/0274750 A1* | 11/2012 | Strong | G01C 21/165 348/52 |
| 2013/0038707 A1 | 2/2013 | Cunningham et al. | |
| 2013/0188923 A1 | 7/2013 | Hartley et al. | |
| 2013/0249947 A1 | 9/2013 | Reitan | |
| 2013/0290557 A1 | 10/2013 | Baratz | |
| 2014/0150032 A1* | 5/2014 | Pacor | H04N 21/21805 725/62 |
| 2014/0340535 A1* | 11/2014 | Nakamura | H04N 5/232 348/207.1 |
| 2015/0007238 A1* | 1/2015 | Crouch | H04N 21/21805 725/93 |
| 2015/0178817 A1* | 6/2015 | Fein | G06Q 30/0635 705/26.81 |
| 2015/0215454 A1* | 7/2015 | Matsuo | H04W 4/22 455/414.1 |
| 2015/0341704 A1* | 11/2015 | Choi | H04N 21/632 725/81 |
| 2015/0347827 A1* | 12/2015 | Dickinson | G06K 9/00302 382/103 |
| 2016/0109703 A1* | 4/2016 | Nishizawa | G02B 27/017 345/8 |
| 2016/0180599 A1* | 6/2016 | Sako | G06T 19/006 348/333.03 |
| 2016/0182940 A1* | 6/2016 | Assayag | H04N 21/4312 725/62 |

OTHER PUBLICATIONS

"International Application Serial No. PCT/US2015/063168, Written Opinion mailed Mar. 15, 2016", 4 pgs.

* cited by examiner

INTERACTIVE BINOCULAR VIDEO DISPLAY

TECHNICAL FIELD

Embodiments described herein generally relate to the capture and display of video content, and in particular, to the interactive display of video content via a mobile device.

BACKGROUND

Optical binoculars and monoculars are widely used by observing persons in large audiences and in other scenarios where the observing persons are located at a significant distance from the performance. For example, opera or theatre spectators may use binoculars or other optical telescopes to obtain a closer view of a special expression or detail on the stage of the observed performance. In a similar fashion, sporting event spectators may use optical binoculars to obtain a closer view of the sporting players or game play. Another usage of optical binoculars is at outdoor viewpoints—such as locations where visitors use a coin-operated tripod mounted binoculars to view detail in the landscape. However, in these and other uses of optical binoculars, the spectator is forced to focus his or her eyesight through the binoculars and thus disconnect from the wider picture while looking through the binocular lenses.

As a result, limited mechanisms have been developed to provide alternative displays and enhance the spectator perspective. For example, in sports arenas and in large music or dance shows, the stage or playing field is often augmented by one or more video screens that display zoomed-in video of the performers. The spectators, however, do not have control of the video scene and are often not able to view a desired person or object, because the video that is displayed is dependent on a director or video producer's choice.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
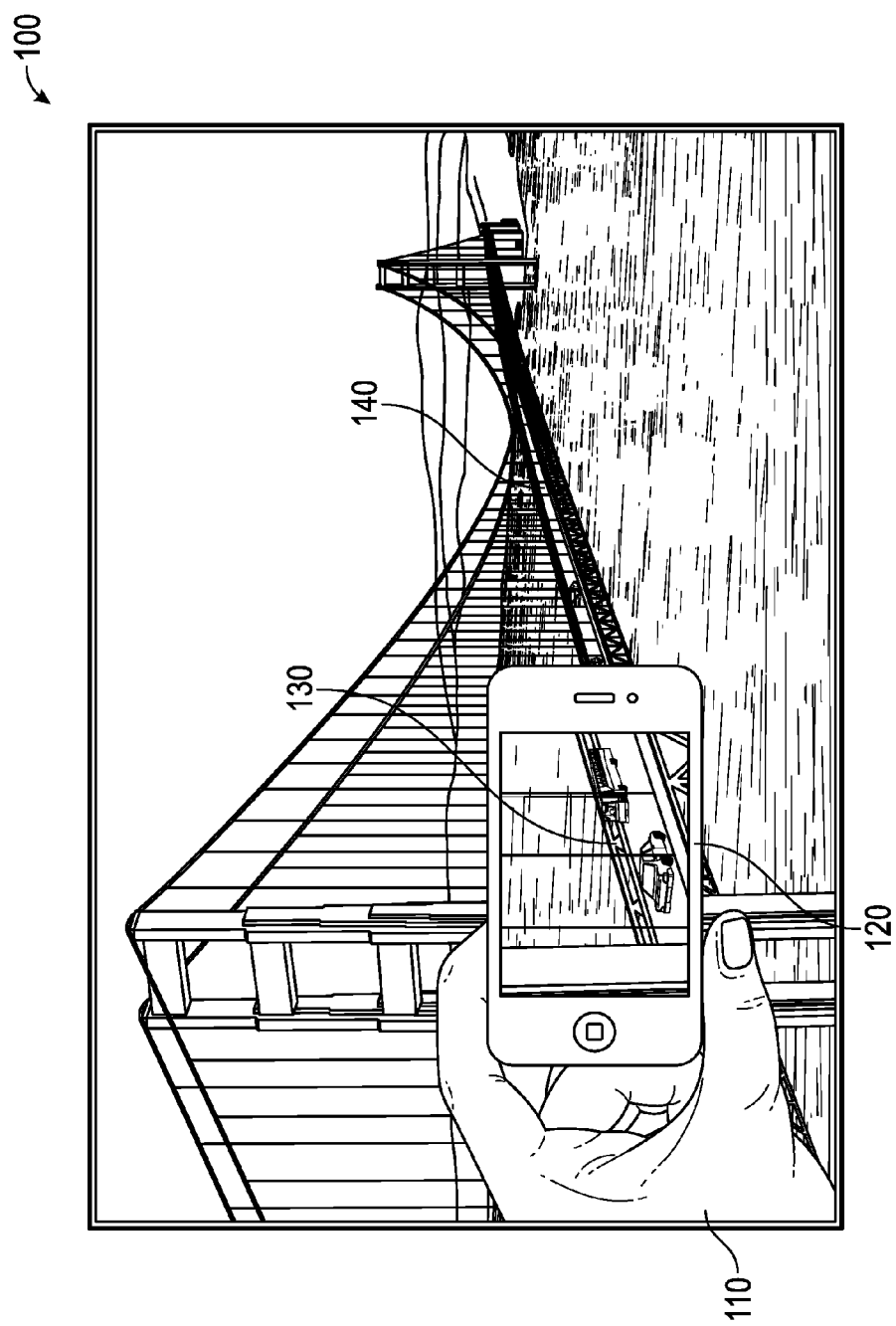
FIG. 1 illustrates a use case for an interactive virtual binoculars video output, displayed with a mobile device, according to an example.

In the following description, systems, methods, and machine-readable media including instructions are disclosed that provide functionality for playback and control of "virtual binoculars" video, which allows spectators of an event to select and view a specific enhanced (e.g., zoomed-in and panned) portion of a human-perceivable event, landscape, or other scene. This virtual binoculars perspective is provided with use of a mobile device, such as a smartphone or tablet, which is configured to receive and process a detailed (e.g., high quality, high definition) video feed of the desired scene. As described herein, a user can use his or her mobile device to output a detailed, enhanced video perspective of the desired scene via a video playback control, allowing the user to select and direct (e.g., pan, zoom, or apply another enhancement to) the captured video display onto a specific part of the desired scene.

The following techniques describe mechanisms for capturing, processing, streaming, and displaying video output in connection with this virtual binoculars video display. In one example configuration, further described below, a number of high-definition cameras positioned at a rear of an area to be viewed (e.g. at the back of a concert hall, at the side of a sporting field, positioned in or near a foreground of a viewing area) are configured to capture and stream high resolution video for the desired scene. These high-definition cameras may be positioned from one or multiple angles (including at static or repositionable locations). The high-definition cameras then provide respective video streams to a central server that receives the video and processes the video into different streams for virtual binocular spectators. Location identification techniques then may be used to correlate a particular video stream with a particular mobile device. This video stream may then be further processed, enhanced (panned, cropped, zoomed-in), and refined for output on the mobile device.

The techniques described herein for providing and controlling a virtual binoculars video display may be enhanced with the use of additional processing and display techniques. For example, augmented reality content may be added as a layer on the virtual binoculars video to be displayed by the mobile device. Various location and activity detection mechanisms may be used to provide useful overlays, advertising, commercials, and like information in connection with the virtual binoculars video display. As another example, user feedback and data may be collected from the use of the video stream feeds and monitored by administrators for improvements to the video feeds or video operations. Additionally, usage information may be sent to the artists or show operators to result in changes to the underlying performance.

Existing techniques for providing a zoomed-in, focused display from a spectator are generally limited to use of optical and electronic zooming mechanisms. For example, some existing smartphones and tablet mobile devices provide limited optical lenses for zooming, and digital zooming enhancements directly on the mobile device. However, the optical zoom capabilities of such devices are typically very limited (e.g., under 5×), and the quality of the video or pictures captured from mobile devices may be greatly diminished, particularly in low-light settings. The use of optical telescopes (such as binocular or monocular telescopes), as previously discussed, may provide users with a zoomed-in and detailed perspective of a portion of a desired scene. However, such binoculars or monoculars must be separately carried by the user and must be placed next to the user's eyes. Thus, the personal use of an optical device requires the user to choose whether to perceive the entire scene at a zoomed-out perspective, or perceive portions of the scene exclusively at a zoomed-in perspective.

The digital video processing, transmission, and display techniques described herein overcome these and other technical issues associated with the selection and output of relevant video sources. In addition, the use of the virtual binoculars video display techniques described herein may be able to provide additional perspective and views that are not possible from the perspective of the user. For example, if part of the scene is hidden by spectators or obstructions located in front of the user, the perspective obtained from a repositioned camera may allow an unobstructed perspective and video output for the scene. The video output provided through the presently described virtual binocular video display may provide such enhanced or unobstructed views while also utilizing the benefits of location-based information for a more realistic and accurate output.

FIG. 1 provides an illustration 100 of a use case of an interactive virtual binoculars video output, provided according to example techniques described herein. The video output in FIG. 1 provides a display having a close-up perspective of a portion of a landscape (as illustrated, a portion of the Golden Gate bridge). In this example, the video output is coordinated with a video capture taken at a viewpoint overlooking the landscape.

As shown, a user 110 operates a mobile device 120 (e.g., smartphone) within the user's field of vision, such as by holding the device in front of the user 110 (between the user 110 and the area of interest). For example, suppose the user wishes to view a portion of a videoed object 140 in a scene, here a portion of the bridge. The video display 130 provides an enhanced zoomed-in perspective of a portion of the videoed object 140 (the bridge), through the output of a magnified portion of the area of interest within a live, video display that is output on the mobile device 120.

The use case for the virtual binoculars video display depicted in FIG. 1 may involve one or multiple cameras, to capture a scene in a direction of view away from the mobile device 120 and towards an area of interest within the scene. For example, one camera may be positioned at a central location at the viewpoint relative to a plurality of spectators, and the video from this viewpoint may be configured to provide one or more streams of digital video content to respective mobile devices. In another example, multiple cameras may be positioned at the viewpoint, at different locations relative to the plurality of spectators. (For example, the multiple cameras may be located throughout different positions at the viewpoint, to allow different camera views and perspectives, depending on the angle of the viewer relative to the videoed object 140, or depending on a more precise direction that a viewer is facing). For the deployment of multiple cameras, the location determination techniques further discussed herein may be used to determine which camera view (and which camera perspective) to select and transmit for use in the virtual binoculars video display. The location determination and image recognition techniques further discussed herein may also be used to provide an interactive control and matching of the position and orientation of the mobile device 120 relative to the videoed object 140, which may involve selection of a different camera view; cropping, scaling, zooming, rotating, panning, or otherwise enhancing (or changing) video output captured from a camera view; or other techniques to imitate the use of a binoculars from the interaction of the user 110 with the mobile device 120.

Figure 2:
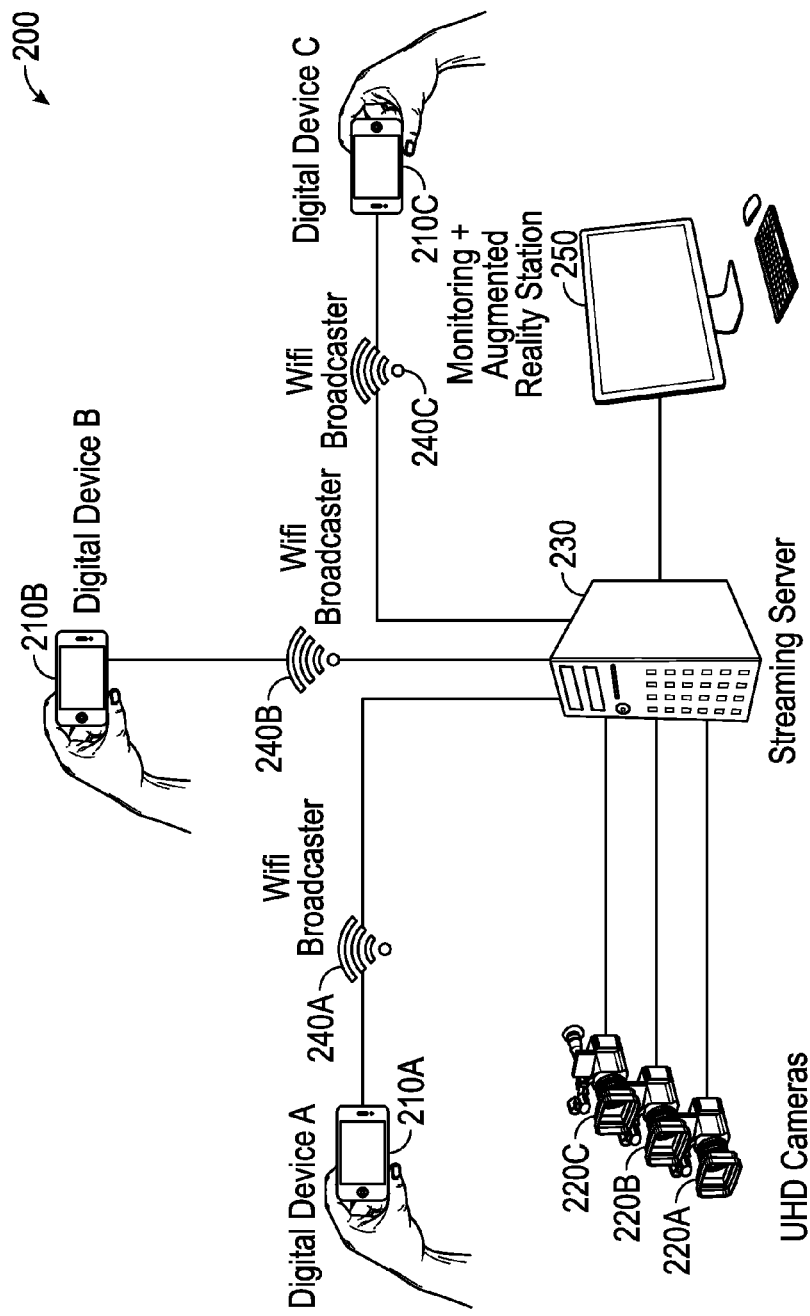
FIG. 2 illustrates an overview of video capture, processing, transmission, and output devices for an interactive virtual binoculars video output, according to an example.

FIG. 2 illustrates a system diagram 200 that depicts the various electronic devices used with the video capture, processing, transmission, and output of an interactive virtual binoculars video output, according to an example. As shown, a number of digital mobile devices 210A, 210B, 210C (e.g., smartphones) operated by respective human users establish an electronic connection to receive video provided from a streaming server 230. As illustrated, this electronic connection is provided with wireless network connections via Wi-Fi broadcasting access points 240A, 240B, 240C (e.g., for Wi-Fi access points operating wireless local area networks in compliance with an IEEE 802.11 standard, such as IEEE 802.11a/b/g/n/ac/ad/af or follow-on amendments to the IEEE 802.11 standard).

The streaming server 230 operates to provide respective streams of video, obtained from respective ultra high definition (UHD) cameras 220A, 220B, 220C, such as cameras configured to capture video in an 4K UHD (e.g., 4096 pixels×2160 lines) or 8K UHD (e.g., 7680 pixels×4320 lines) format. In some examples, the streaming server 230 provides a common video stream at each Wi-Fi network via the access points 240A, 240B, 240C, and operates to multicast the respective video stream from a particular camera to a plurality of connected devices, on the respective Wi-Fi access point (or for plurality of Wi-Fi access point). In other examples, the streaming server 230 operates to provide individual video streams, with the content in an individual video stream being customized to an individual connected device. It will be understood the streaming server 230 may utilize any combination of streaming, casting, and video serving techniques in connection with the wireless transmission of the video streams to the mobile devices 210A, 210B, 210C.

As further shown in FIG. 2, the streaming server 230 is further connected to an administration station, identified as a monitoring and augmented reality station 250. For example, the monitoring and augmented reality station 250 may be used for human-assisted or automated monitoring and control of the video streams and video content obtained from the UHD cameras 220A, 220B, 220C, including the switching, enhancement, and termination or resumption of video feeds from the cameras. The monitoring and augmented reality station 250 may also be used in connection with a human-assisted or automated generation and overlay of augmented reality content onto a video stream.

In further examples, the augmented reality content supplied in connection with the monitoring and augmented reality station 250 may include additional content, information, or metadata. For example, such content may include the identification of performers (such as the name of a musician or athlete) or objects, overlaid as subtitles on the video output. Any number of augmented reality techniques to allow the addition and presentation of content based on the identification of persons, objects, markers, and the like may be automatically applied (or applied with use of human control, either administrator or end user) within a virtual binoculars video display on a mobile device 210A, 210B, 210C.

For example, augmented reality content may be customized and displayed according to the particular zoom level being applied by the user in the virtual binoculars video display. In such examples, certain augmented reality content may be added and displayed only when zooming into a particular feature (or when a particular feature is significantly visible within the mobile device screen), to provide more information on certain features as the features become more prominent in the video display. In a similar manner, such augmented reality content may be removed or toggled when zooming out or panning to objects in the video stream.

In further examples, the virtual binoculars video output at the respective devices 210A, 210B, 210C may be customized according to the location of the spectator and the location and orientation of the spectator's mobile device 210A, 210B, 210C. The approximate location of the spectator's mobile device 210A, 210B, 210C may be derived by the connection to a particular Wi-Fi access point 240A, 240B, 240C in a known layout of access points, for example. In other examples, the approximate location of the spectator's mobile device 210A, 210B, 210C may be derived by signal strength relative to one or more access points, or triangulation or trilateration techniques applied with the comparison of signals or information received from multiple Wi-Fi access points 240A, 240B, 240C. In other examples, the approximate location of the spectator may be determined in connection with Bluetooth low energy beacons, RFID tags, or other temporary or permanent location markers.

In further examples, the location of the spectator relative to the scene that is captured may be determined in connection with a combination of location determination (e.g., from Wi-Fi access points 240A, 240B, 240C), and from the detection of a location marker observed in a video or still image captured by the mobile device directly at the spectator's location. For example, a camera of the mobile device 210A, 210B, 210C, positioned distal to the spectator (e.g., the mobile device 210A, 210B, 210C being located between the spectator and the object to be observed), may capture an image of the field of view. This image may capture several location markers, such as markers placed on a stage, near a particular performer, at defined areas of the sports arena, and the like. The markers then may be detected and used in correlating the particular perspective of the spectator to the area of interest in the field of view (and within a defined observing area for the spectator). A digital image of the visible markers may be continually captured and processed at a time interval, after every (or after a series) of movement of the device, and the like. Processing and location coordination of the marker digital image may be performed at the mobile device 210A, 210B, 210C, or at a location processing component at a server.

Figure 3:
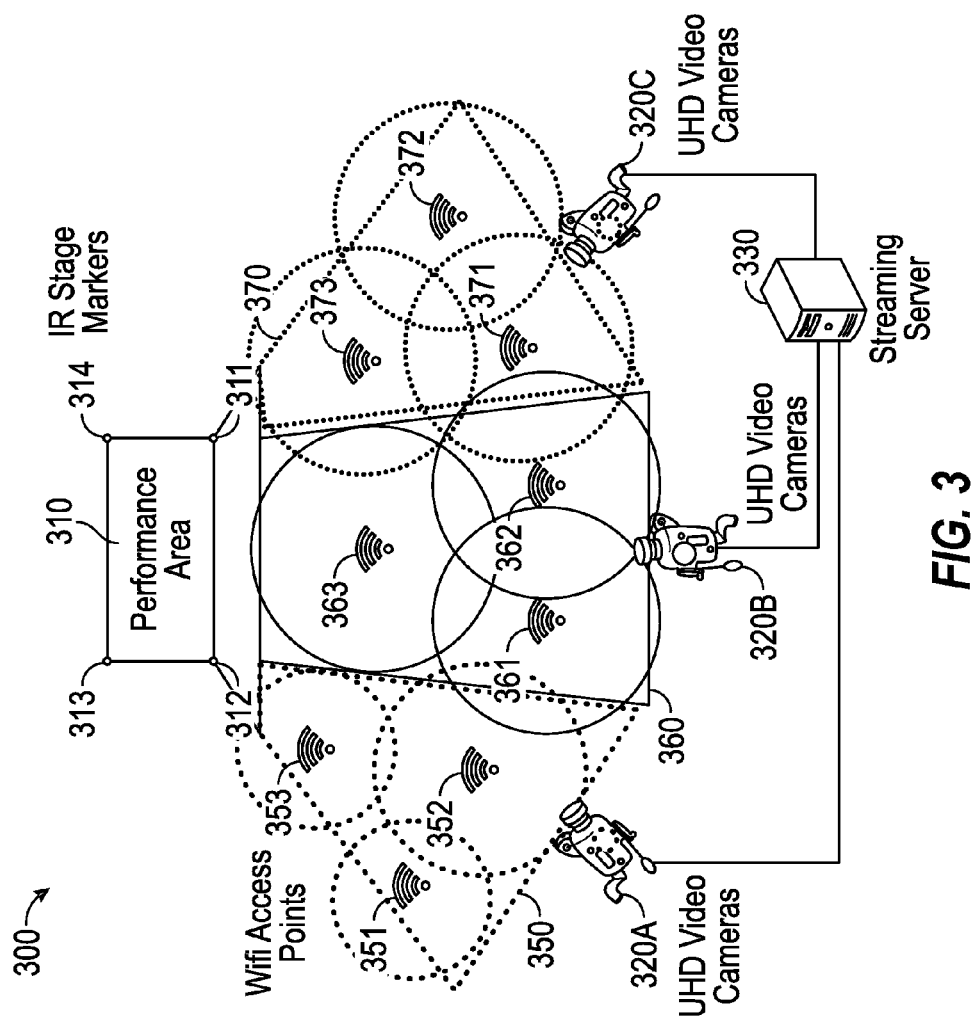
FIG. 3 illustrates a diagram of video capture and network transmission locations for an interactive virtual binoculars video output, provided in a performance area according to an example.

FIG. 3 provides an illustration of a system diagram 300 of video capture and network transmission locations for an interactive virtual binoculars video output, provided for video of a performance area according to an example. Within the system diagram 300, the performance area 310 (e.g., a stage for music, theater, or other performance) is identified with a plurality of stage markers 311, 312, 313, 314 positioned at the corners of the stage, for example.

In front of the performance area 310, three seating sections 350, 360, 370 are defined for the audience of spectators. These three seating sections 350, 360, 370 respectively correspond to the three UHD video cameras 320A, 320B, 320C, located within or proximate to (e.g., behind, above) the seating sections. The UHD video cameras 320A, 320B, 320C, for example, may be positioned in a line of sight to the performance area 310 without experiencing obstruction by the audience of spectators in the three seating sections 350, 360, 370.

Within each of the three seating sections 350, 360, 370, a plurality of Wi-Fi access points are further located. For example, the seating section 350 includes Wi-Fi access points 351, 352, 353; the seating section 360 includes Wi-Fi access points 361, 362, 363; the seating section 370 includes Wi-Fi access points 371, 372, 373. The respective Wi-Fi access points may have overlapping coverage ranges, but are generally located to provide a strongest signal (and most likely coverage and network connection) to a user within a particular seating section associated with a UHD video camera. As such, the location of a particular mobile device may be determined based on the connection of the mobile device to a known Wi-Fi access point located in a known seating section.

The streaming server 330 is configured to provide video from the respective video cameras to spectators connected to the various Wi-Fi access points, based on the location of the spectator's mobile device within the seating section 350, 360, or 370, and the connection of the spectator's mobile device to the respective Wi-Fi access point. The correlation of the Wi-Fi access point name or Service Set Identifier (SSID), for example, to the location of the mobile device may be used to select the relevant camera positioned in or adjacent to the coverage area of the Wi-Fi access point (such as the camera corresponding to the seating or viewing area). Accordingly, the particular Wi-Fi access point that the mobile device accesses may provide a rough approximation of the location of the spectator, and thus, may be used to select the appropriate video feed from the UHD video camera to stream to the mobile device. In some examples, the particular UHD video camera and high-definition video stream may be automatically determined and started according to the connection of the respective Wi-Fi access point.

As shown, the performance area 310 includes a series of infrared (IR) markers 311, 312, 313, 314 (e.g., infrared lights) located at the perimeter of the stage. These markers 311, 312, 313, 314 may be used in connection with further location and repositioning of the virtual binoculars video display, to match a spectator's desired video panning and zoom level relative to the position and three-dimensional orientation of the mobile device. For example, the markers may be detected by the mobile device to automatically pan or zoom the high-definition video stream based on the field of view relative to the spectator and the particular orientation (e.g., attitude) of the mobile device (e.g., in the air, held in front of the spectator). Accordingly, automatic pan and zoom of the high-definition video stream may be used to effectively emulate a "binoculars" effect that matches or closely resembles the spectator's field of view and human-perceived environment.

In further examples, the markers 311, 312, 313, 314 need not utilize IR but may involve other colored markers, barcodes or QR codes, or other human or machine detectable markers or objects that are recognizable by the mobile device. Accordingly, various repositioning, zoom, panning, and video enhancement or modification techniques may occur automatically (or to assist manual control) for the video stream. In other examples, other machine-to-machine communication and object detection techniques (including facial detection) may be used to coordinate the orientation of the mobile device relative to the desired video output and corresponding zooming, panning, and other modifications to the video stream. For example, the mobile device may utilize human outline or face detection techniques to identify that a human person (e.g., a particular musician) is located within a scene, the accompanying high-definition video stream may be zoomed and centered on this particular person.

In some examples, the UHD video cameras 320A, 320B, 320C are located at temporarily or permanently fixed positions, to allow a plurality of users to access a commonly placed video feed. In other examples, one or more the UHD video cameras 320A, 320B, 320C may be repositioned as a result of a command of an administrator, or in connection with spectator feedback or control. For example, the positioning of the UHD video cameras 320A, 320B, 320C may be changed based on the relative location of the mobile devices to the performance area 310, the number of spectators located within distinct areas of the audience viewing area, user activity with viewing or selecting portions of the video stream, and the like. Adaptive processing may occur to modify the video stream and the display of the video on the mobile device in the event of a repositioning of the UHD video cameras 320A, 320B, 320C.

In further examples, the virtual binoculars video output is further customizable based on the activity of the spectator and the interaction with the spectator's mobile device. For example, the virtual binoculars video output may be customized to the zooming factor requested by the zooming spectator. Accordingly, the spectator may obtain a virtual zooming experience with the mobile device while being able to simultaneously perceive the real-time event. In other examples, the user may wish to switch perspective of the area of interest from other locations, to view the area of interest from another spectator's angle or side of the seating area, for example. Various user interface commands may be presented to the spectator to allow switching between feeds among different UHD video cameras and perspectives. In some examples, the zooming, panning, cropping, or other display modification of the video is performed on the mobile device, to perform the display modification on a video stream broadcast to multiple users. In other examples, the zooming, panning, cropping, or other display modification of the video is performed on the server side, to perform the display modification on a video stream customized to one or a limited number of users.

Figure 4:
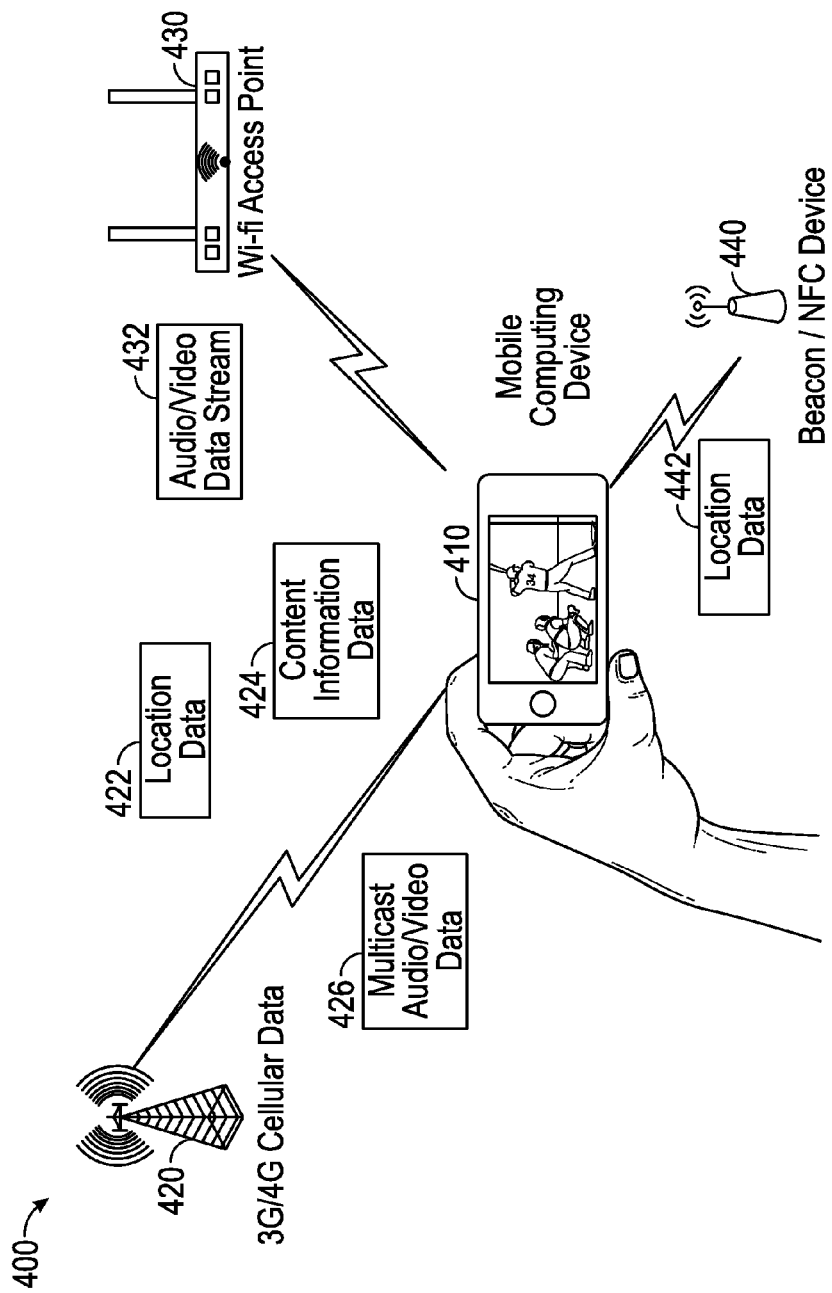
FIG. 4 illustrates a data transmission diagram of video and information data for an interactive virtual binoculars video output, according to an example.

FIG. 4 illustrates a data transmission diagram 400 of video and information data for an interactive virtual binoculars video output according to an example. As shown, a mobile device 410 may connect to a Wi-Fi access point 430 to receive an audio/video data stream 432 (for example, using the Wi-Fi video streaming techniques described above with reference to FIG. 3.) In some examples, the audio/video data stream 432 provides exclusively video or image-based content without audio content.

The transmission of the audio/video data stream 432 to respective mobile devices may occur in connection with individual data connections, data connections to groups of users, multicasts and broadcasts of video data streams, and the like. The audio/video data stream 432 may be accompanied by the receipt of content information data 424, such as augmented reality informational content, promotional and advertising information, or like information obtained from an internal server or from internet-based sources. The mobile device 410 then may output the audio/video data stream 432 and the content information data 424 (including an overlay of the content information data 424 in an augmented reality perspective).

The audio/video data stream 432 also may be accompanied by the receipt of location data 422. The location data 422 may provide specific information used in displaying or controlling the output of the audio/video data stream 432, including the use of data to provide options to change the perspective of video content output on the mobile device 410. Additionally, location data 442 may also be provided in connection with Bluetooth low energy (BLE) beacons 440 or like near field communication (NFC) devices. For example, information from such beacon/NFC devices may be used with location services (operating locally or remotely) to coordinate an identifier with a particular location, used in controlling or affecting the video stream displayed on the mobile device 410. Information on beacons 440, for example, may be used to identify a specific video feed or video perspective for a particular mobile device.

In the example depicted in FIG. 4, a stream of audio/video content also may be received in connection with a multicast audio/video data stream 426. For example, the multicast audio/video data stream 426 may be provided from a multi-user broadcast technique of content via wireless wide area network 420, such as a Long Term Evolution (LTE) or another 3G/4G cellular data network, broadcasted to a plurality of mobile device users. As further shown in FIG. 4, the mobile device 410 may also receive the content information data 424 and the location data 422 in connection with the wireless wide area network 420. For example, information obtained by the mobile device 410 via an internet connection over the wireless wide area network 420 may be used to supplement the display and playback of a video stream from the Wi-Fi access point 430.

Data processing used in connection with the display of the video stream may involve many possibilities of client-side and server-side processing. For example, in large environments where thousands of users may attempt to utilize a virtual binoculars video display, it may not be feasible for each of these users to communicate data (e.g., location identifiers, or still images from a camera that include markers) back to a server for processing. In such environments, each individual device may be configured to determine the location of the user, and then perform coordination between the location of the mobile device and the appropriate zoom, panning, and perspective enhancement to apply to the high-definition video stream.

As a further example, to reduce the amount of data being uploaded to the server, a high-quality, high-resolution video stream may broadcasted and multi-casted to large groups of users (or even all users) at a single time. The coordination of location information to the video display parameters may occur client-side, with individual devices determining the particular perspective to render with the virtual binoculars video display. For example, image capture and recognition (including recognition of location markers, certain objects, or persons) may be used to reorient the display of a large video stream to only a select enhanced portion of the video stream (e.g., panned and zoomed in).

The use of the virtual binoculars video display may be provided in connection with special purpose software, hardware, and peripherals. For example, functionality associated with the virtual binoculars video display may be provided in connection with a dedicated software application (e.g., mobile app) that may be installed on the mobile device before or during the subject performance. This software application may be used to coordinate the video stream and access a camera for perspective information. The functionality associated with the virtual binoculars video display may also be incorporated as part of a communication program, such as an instant message, chat, or video conferencing program. In other examples, the functionality associated with the virtual binoculars video display may be integrated into operating system functionality for the mobile device.

Figure 5:
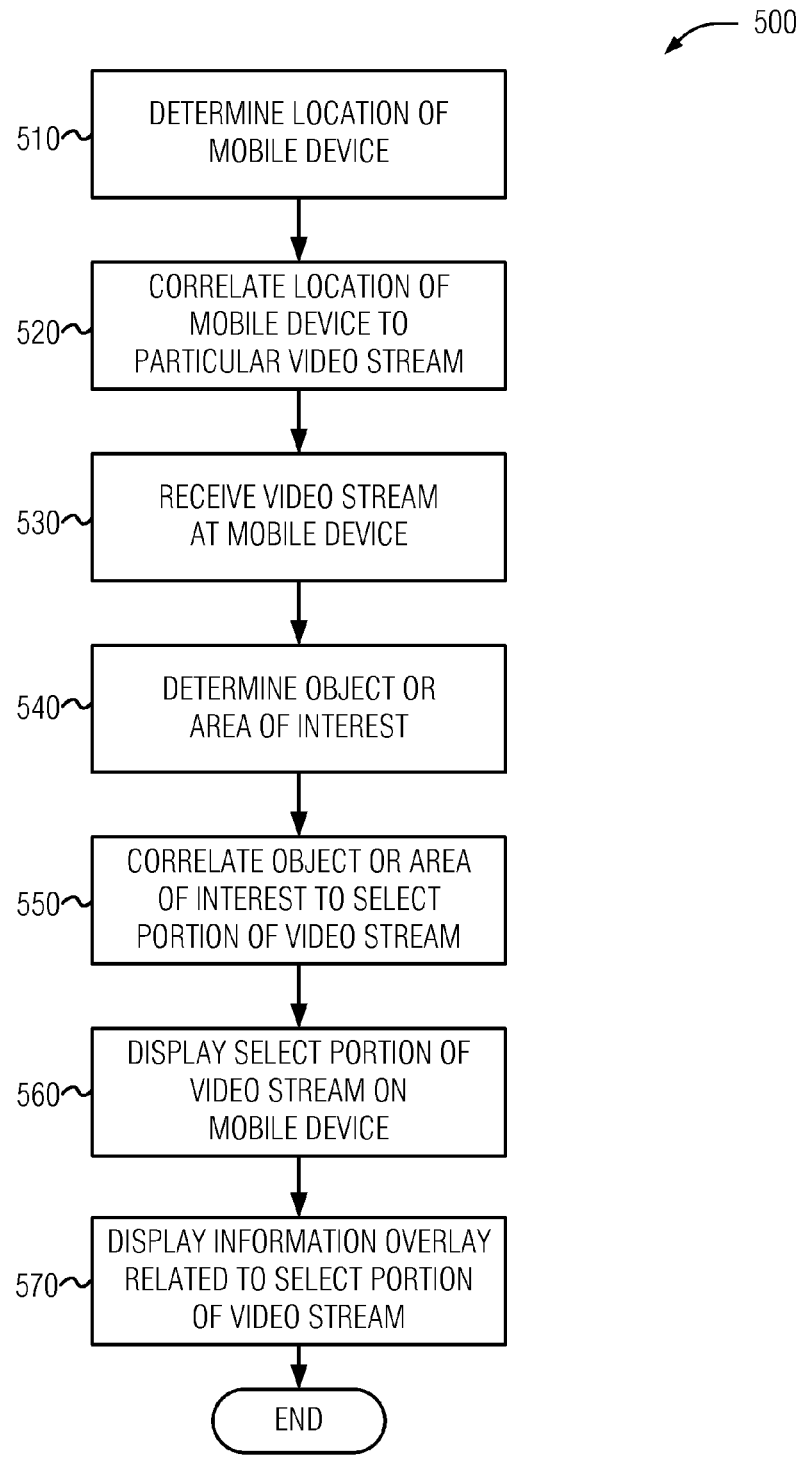
FIG. 5 illustrates a flowchart of a method for playback of a virtual binoculars video output at a mobile device, according to an example.

FIG. 5 illustrates a flowchart 500 for a method of playback for a virtual binoculars video output at a mobile device, according to an example. The method operations may include location-based operations to determine the location of the mobile device (operation 510), and to correlate the location of the mobile device to a particular video stream (operation 520). For example, the location-based operations may be performed in connection with the identification of a particular Wi-Fi access point, or the provision of a beacon or RFID tag identifier to a remote server. The location information may be used to request a particular video stream correlating to a perspective from the location or area of interest. In response to the request, the particular video stream may be wirelessly transmitted to (and received at) the mobile device (operation 530).

The positioning and panning, zooming, and reorientation of the video output from the video stream to match the perspective from the mobile device may occur in connection with location identification, image matching, or other techniques to correlate the location of the mobile device (and the user perspective) with a portion of the video stream. For example, the mobile device may perform operations to identify a particular marker that is visible next to an object or area of interest (operation 540), and correlate a detected object or area of interest to a select portion of the video stream (operation 550). The detected object or area of interest may be used to center, pan, zoom, or otherwise modify the display output of the video stream, such as to only display a select portion of the video stream on the mobile device (operation 560).

As further illustrated in the flowchart 500, additional information, such as an information overlay (e.g., of augmented reality content) may be provided to the mobile device and displayed (operation 570). For example, the information overlay may be placed over the select portion of the video display that is zoomed in and panned to a particular person, object, or scene.

Figure 6:
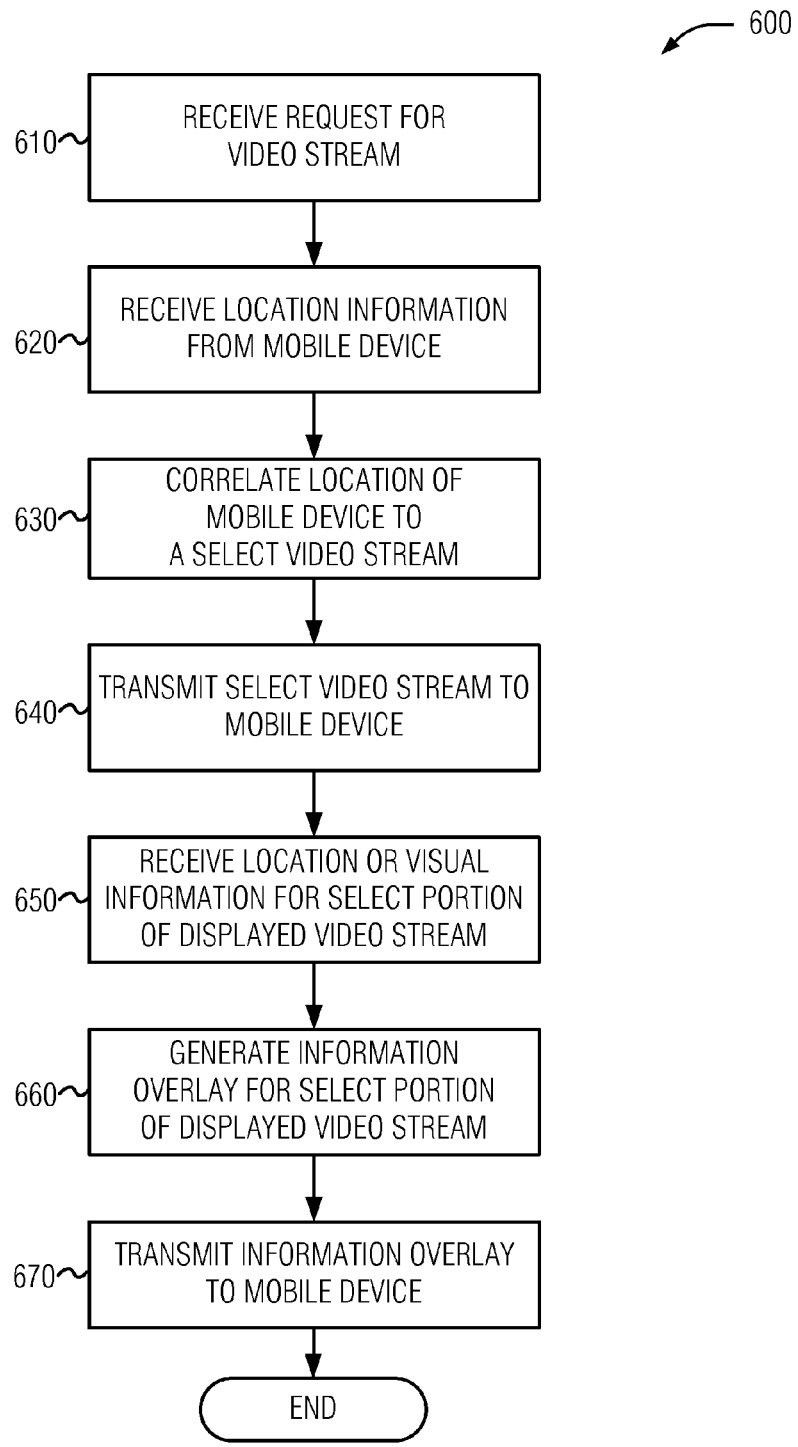
FIG. 6 illustrates a flowchart of a method for streaming virtual binoculars video output at a video processing server, according to an example.

FIG. 6 illustrates a flowchart 600 for a method of streaming video in connection with virtual binoculars video output, the method performed with operations executed at a video processing server. It will be understood that the operations of the flowchart 600 may occur at a single server, at a cloud-based or distributed server, or through the coordination of multiple computing devices or platforms for video processing functionality.

As illustrated, the method operations include location-based operations for a selection of a particular video stream. The selection may be performed from data obtained with the receipt of a request for a video stream (operation 610) and the receipt of location information for the mobile device (operation 620). Based on the location information, the location of the mobile device may be determined and correlated to a select video stream (operation 630), this select video stream located in the field of view of the user at the location of the mobile device. The select video stream then may be transmitted to the mobile device for output (operation 640).

Additionally, an information overlay may be generated and produced in connection with the video stream. For example, the server may receive additional location or visual information (e.g., an identifier from a location marker) pertinent to a select portion of the video stream (operation 650), such as an enhanced zoomed-in, panned portion of the select video stream. From this location information, an information overlay such as augmented reality labels, identification information, and the like may be generated for the select portion of the displayed video stream (operation 660). This information overlay may be transmitted to the mobile device (operation 670) to be output on the mobile device as a layer above the displayed video stream, for example.

Figure 7:
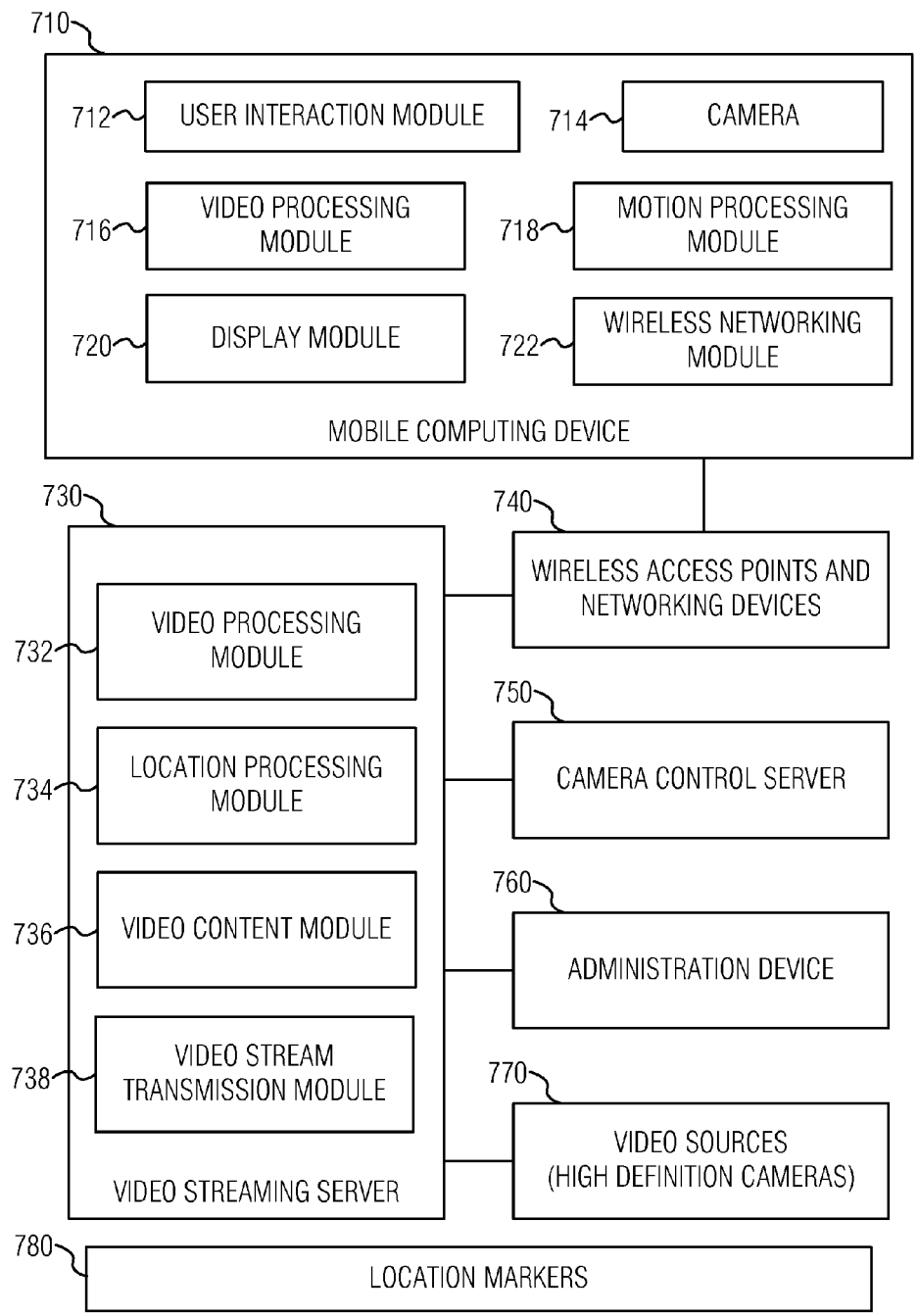
FIG. 7 illustrates a block diagram for components of a system for an interactive virtual binoculars video output, according to an example.

FIG. 7 illustrates a block diagram for components of an electronic system for an interactive virtual binoculars video output, according to an example. As shown, the electronic system is illustrated as including a mobile computing device 710 electronically connected to a video streaming server 730 through a set of wireless access points and networking devices 740. The video streaming server 730 may be in electronic communication with a camera control server 750, an administration device 760, and camera video sources 770. The electronic system may also include or operate in connection with location markers 780. It will be understood that the operation of the electronic system may include additional computing devices, servers, and networking equipment, as well as alternative networking connections among the components that operate in the electronic system.

As shown, the mobile computing device 710 (e.g., a smartphone or tablet) includes a series of modules (e.g., software, hardware, or software-configured hardware) used to perform the processing of the video stream received from the video streaming server 730 via one or more of the wireless access points and networking devices 740. The modules of the mobile computing device may include a user interaction module 712, a video processing module 716, a motion processing module 718, a display module 720, and a wireless networking module 722. The mobile computing device 710 may further include a camera 714 and associated camera image capture modules, and a display screen such as a touch display screen configured to receive gestures.

The user interaction module 712 may be configured to receive user commands to select, start, or stop an interactive video feed, provided in a video display output on the mobile computing device 710. The user interaction module 712 may include features for receiving interaction and commands to control the video display output on the display module 720, which may include interaction and commands for: panning and zooming video (including through the use of touch screen gestures), providing a split screen view, locking or freezing the video display on a particular person or object, and the like.

The display module 720 may be configured for displaying a video for a particular portion in the field of view that the mobile computing device is pointed at or facing. For example, the particular portion in the field of view may be determined in connection with the use of the camera 714, used to capture a local camera image from the perspective of the mobile computing device 710, and in connection with correlation of the local camera image with the video stream.

The video processing module 716 may be configured for receiving the video stream, determining the correlation with the local camera image, implementing zooming, panning, and other enhancing effects for the video, and providing output for the display module 720. The motion processing module 718 may be configured for adapting the display of the zoomed/panned video, including processing movement and motion input of the mobile computing device relative to the observed location markers, and processing movement of the mobile computing device as detected by accelerometers and gyroscopes, and other mechanisms. The motion processing module 718 may operate in connection with the video processing module 716 and display module 720 to enable interactive changes to the video display as the mobile computing device is moved and repositioned by the user.

The wireless networking module 722 of the mobile computing device 710 may include functionality to establish and manage connections with a wireless network, for receipt of the video stream via a wireless network. The wireless networking module 722 also may provide functionality to indicate an approximate location of the mobile computing device 710 in the viewing or seating area, through reporting the set and quality of Wi-Fi signal(s) received, for example, or by providing raw data (or a camera image) to a server to compute the approximate location of the mobile computing device.

As shown, the video streaming server 730 includes a series of modules (e.g., software, hardware, or software-configured hardware) used to perform the processing and serving of video streams to the respective mobile computing devices. The modules of the video streaming server 730 may include a video processing module 732, a location processing module 734, a video content module 736, and a video stream transmission module 738. The video streaming server 730 receives the different video streams from the video sources 770, and allocates the most appropriate stream to each of the mobile computing device (based on the location of the mobile computing device and the watching angle of the mobile computing device).

The video processing module 732 may be used for receiving and processing a plurality of video streams, and allocating a most appropriate video stream according to the location, device characteristics, or interactions of the mobile computing device 710. The video processing module 732 may operate in connection with a location processing module 734. The location processing module 734 may be used to obtain and correlate the location of a particular mobile computing device (or devices) in a mapped or known environment to a particular video feed. The location processing module 734 may also be used to provide the mobile computing device 710 with general location information, or location-dependent display settings for a particular video feed.

The video content module 736 may provide additional content in connection with augmented reality or other content overlay techniques. For example, the video content module 736 may be used to provide additional metadata layers of objects and persons depicted in the video feed. These metadata layers may include information such as subtitles, lyrics, performer or athlete information, and the like.

The video stream transmission module 738 may be adapted to provide the respective video stream (and accompanying broadcast techniques for the video) and accompanying augmented video information, in one or more streaming formats and codecs. The video stream transmission module 738 may also collect usage information for the video feed to be processed and utilized by artists, show operators, and the like.

In further examples, the video streaming server 730 may be used to provide paid or controlled access content for particular devices or users. The video streaming server 730 may also be integrated with subscription features and billing for a service-based offering of the virtual binoculars video output. Additionally, the video streaming server 730 may provide an encrypted video feed, where subscribing users access the broadcast video stream with use of a decrypting key.

The wireless access points and networking devices 740 may include various Wi-Fi transmission equipment and devices, configured to establish wireless networking connections with respective mobile computing devices. In some examples, the wireless access points may be arranged in locations so that all the spectator devices are within range of at least one access point, and to allow for a quality of the signal for download streaming of around 20 Mbps.

Other components of the system allow further control and customization of the video output transmitted by the video streaming server 730. For example, a camera control server 750 may include additional functionality for an administrator, performer, or outside control (including repositioning) of the video sources 770. An administration device 760 may include functionality for administrator monitoring and control of system usage and operation. In further examples, specific control overlaid content for the video streams may be included and modified through use of the administration device 760.

The video sources 770 may include one or a plurality of video cameras, such as UHD video cameras. The video sources may be arranged to capture video from the far background of the show or performance space, and transmit the video streams to a video streaming server 730. The number of video sources may depend upon the size of the theatre, as increasing the number of cameras and camera perspectives may make the spectator experience more realistic. In some settings, however, such as outdoor viewpoints, one camera may be used to generate the video streams. In some examples, standard definition or sub-HD video cameras may be used, for example, when providing video to display devices with lower resolutions, bandwidth, or processing capabilities.

The location markers 780 may be implemented as infrared markers, electronic beacons, human- or machine-readable identifiers, or other types of detectable objects. For example, a set of infrared markers may be positioned around a stage or performance area, producing light that is invisible to the human eye but visible to all smartphone cameras. As also discussed above, usage of the location markers 780 may be replaced or supplemented by the operations of the mobile computing device 710 to correlate between images of the internal camera and the broadcasted video, and align the illustrated image.

While many of the examples described herein refer to the use of the mobile devices, cameras, and video streaming operations at concerts, sporting events, and like performances, it will be understood that the applicability of these video techniques may apply to any number of settings where a camera perspective of a long-range object may be conveyed to a human user. Although many of the examples were provided herein with reference to a mobile device such as a smartphone, it will be understood that the virtual binocular techniques may be used with other types of computers, tablets, wearable devices (e.g., smart glasses), and devices with display functionality. Further, the location and wireless network transmission techniques described herein are not limited to the use of a wireless local area network such as an IEEE 802.11 network, but may be further applied with the use of any number of short area, local area, and wide area wireless communication technologies.

Embodiments used to facilitate and perform the techniques described herein may be implemented in one or a combination of hardware, firmware, and software. Embodiments may also be implemented as instructions stored on at least one machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
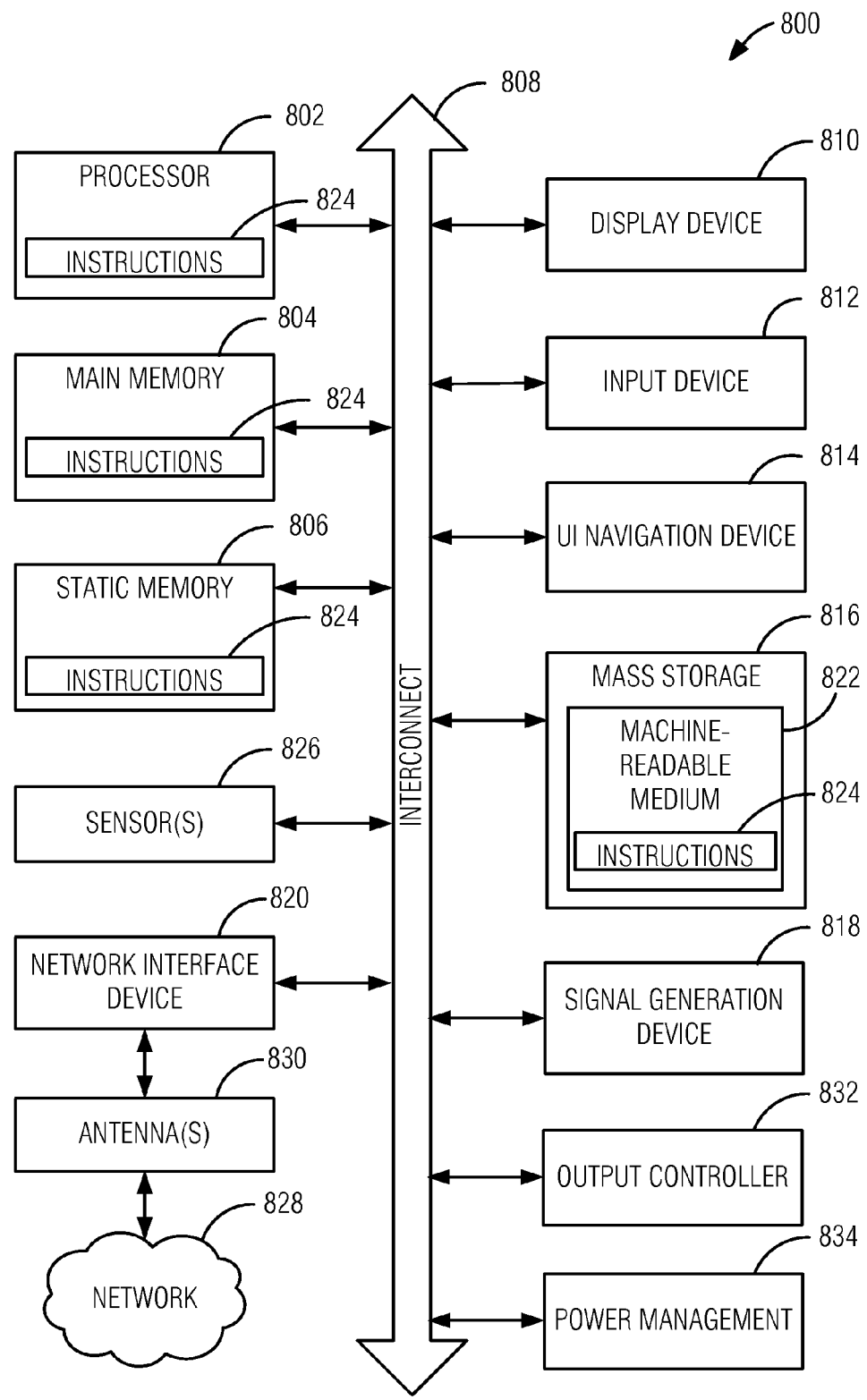
FIG. 8 illustrates a block diagram for an example machine upon which any one or more of the techniques (e.g., operations, processes, methods, and methodologies) discussed herein may be performed, according to an example.

FIG. 8 is a block diagram illustrating a machine in the example form of a computer system 800, within which a set or sequence of instructions may be executed to cause the machine to perform any one of the methodologies discussed herein, according to an example embodiment. Computer system machine 800 may be embodied by the mobile device 120, 210, 410, 710, the streaming server 230, 330, the monitoring and augmented reality station 250, components of the video cameras, wireless network access points, beacons and location devices, and wireless broadcasting hardware, or any other electronic processing or computing platform described or referred to herein. Further, the advanced driver assistance system subsystems included in the motor vehicles described herein may include a processing system functioning substantially similar to the following described computer system.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via an interconnect 808 (e.g., a link, a bus, etc.). The computer system 800 may further include a video display unit 810, an alphanumeric input device 812 (e.g., a keyboard), and a user interface (UI) navigation device 814 (e.g., a mouse). In one embodiment, the video display unit 810, input device 812 and user interface (UI) navigation device 814 are incorporated into a touch screen display. The computer system 800 may additionally include a storage device 816 (e.g., a drive unit), a signal generation device 818 (e.g., a speaker), an output controller 832, a power management controller 834, a network interface device 820 (which may include or operably communicate with one or more antennas 830, transceivers, or other wireless communications hardware), and one or more sensors 826, such as a global positioning system (GPS) sensor, compass, accelerometer, location sensor, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes subject matter (embodied for example by a device, apparatus, machine, or machine-readable medium) for a mobile computing device to provide a virtual binocular video display, comprising: a processor; a wireless networking module, to operate with the processor, the wireless networking module to receive a selected stream of video data from a video streaming server via a wireless network; a video processing module, to operate with the processor, the video processing module to process video content from the stream of the video data, wherein the selected stream of video data is selected based on a location of the mobile computing device in a viewing area located in proximity to a scene captured in the video data; and a display module, to operate with the processor, the display module to output a select enhanced portion of the video content on a display screen of the mobile computing device, the select enhanced portion determined based on an orientation of the mobile computing device relative to the scene captured in the video data.

In Example 2, the subject matter of Example 1 may include, a user interaction module implemented via the processor, the user interaction module to receive user commands to effect control of the output of the select enhanced portion of the video content on the display screen, wherein the select enhanced portion of the video content provides a zoomed and panned portion of the video content from the stream of the video data.

In Example 3, the subject matter of any one of Examples 1 to 2 may include, a motion processing module implemented via the processor, the motion processing module to change the select enhanced portion of the video content on the display screen based on at least one motion input detected by the mobile computing device.

In Example 4, the subject matter of any one of Examples 1 to 3 may include, wherein the wireless networking module is to receive the stream of the video data via operation of the wireless network according to an IEEE 802.11 wireless network protocol, wherein the selected stream of the video data is selected based on a location of the mobile computing device relative to at least one access point of the wireless network located within the viewing area, and wherein an identification of the location of the mobile computing device relative to the access point of the wireless network is communicated to the video streaming server to indicate the location of the mobile computing device.

In Example 5, the subject matter of any one of Examples 1 to 4 may include, wherein the video processing module is to correlate at least one indicator detected in the video content to the orientation of the mobile computing device relative to the scene captured in the video data.

In Example 6, the subject matter of any one of Examples 1 to 5 may include, a camera, the camera to capture an image of at least a portion of the scene including the at least one indicator, wherein the video processing module is to correlate the image of at least the portion of the scene including the at least one indicator to the select enhanced portion of the video content.

In Example 7, the subject matter of any one of Examples 1 to 6 may include, wherein the video processing module is further to compare and match the image of at least the portion of the scene captured by the camera with an image of the scene captured in the video data, to determine the orientation of the mobile computing device relative to the scene.

Example 8 includes subject matter (such as a method, means for performing acts, machine readable medium including instructions that when performed by a machine cause the machine to performs acts, or an apparatus to perform) for displaying streaming video at a mobile device, implemented by operations executing with hardware components at the mobile device, the operations comprising: accessing a selected high-definition video stream at the mobile device, the high-definition video stream providing high-definition video of a scene captured in a direction of view away from the mobile device and towards an area of interest of the scene; correlating an orientation of the mobile device relative to the area of interest with a particular zoomed portion of the high-definition video of the scene; and displaying the particular zoomed portion of the high-definition video of the scene on the mobile device.

In Example 9, the subject matter of Example 8 may include, panning the high-definition video of the scene to the particular zoomed portion of the high-definition video, the panning performed using the orientation of the mobile device relative to the area of interest; and zooming the high-definition video of the scene to the particular zoomed portion of the high-definition video, the zooming performed using the orientation of the mobile device relative to the area of interest.

In Example 10, the subject matter of any one of Examples 8 to 9 may include, providing location information of the mobile device to a remote server, the location information indicating a location of the mobile device in an observation area adjacent to the scene; and receiving the high-definition video stream from one of a plurality of high-definition video streams, the high-definition video stream selected by the remote server based the location information of the mobile device.

In Example 11, the subject matter of any one of Examples 8 to 10 may include, capturing, with the mobile device, a digital image of the scene; detecting, with the mobile device, a marker in the digital image of the scene; and selecting the particular zoomed portion of the high-definition video based on the position of the marker detected by the mobile device within the high-definition video of the scene, the particular zoomed portion of the high-definition video providing a subset of the larger high-definition video.

In Example 12, the subject matter of any one of Examples 8 to 11 may include, wherein correlating the orientation of the mobile device to the particular zoomed portion of the high-definition video includes matching the marker in the digital image of the scene to a marker in an image of the high-definition video of the scene, to simulate a perspective of the scene from the mobile device in the selecting of the particular zoomed portion of the high-definition video.

In Example 13, the subject matter of any one of Examples 8 to 12 may include, wherein the marker is provided by at least one infrared light positioned in the scene.

In Example 14, the subject matter of any one of Examples 8 to 13 may include, wherein the marker is a machine-readable object positioned in the scene, the machine-readable object providing an identifier associated with a location relative to the scene.

In Example 15, the subject matter of any one of Examples 8 to 14 may include, capturing, with the mobile device, a digital image of the scene; performing an image recognition of at least one object in the digital image of the scene; and selecting the particular zoomed portion of the high-definition video based on correlation of the orientation of the mobile device to the particular zoomed portion of the high-definition video, the particular zoomed portion of the high-definition video providing a subset of the larger high-definition video.

In Example 16, the subject matter of any one of Examples 8 to 15 may include, displaying an information overlay on the particular zoomed portion of the high-definition video, the information overlay providing information about at least one real-world item portrayed in the particular zoomed portion of the high-definition video.

In Example 17, the subject matter of any one of Examples 8 to 16 may include, processing at least one user input received in connection with a graphical user interface output with the mobile device, the at least one user input used to: select the high-definition video stream from among a plurality of high-definition video streams; perform panning of the high-definition video of the scene to another area of interest of the scene; or perform zooming of the high-definition video of the scene to generate a zoomed display of another portion of the area of interest of the scene.

Example 18 includes subject matter (embodied for example by a device, apparatus, machine, or machine-readable medium) for outputting a video display on a mobile computing device, implemented with instructions, that when executed, cause the mobile computing device to: establish a connection with a wireless network; capture a digital image from a perspective of a first side of the mobile computing device, using a camera located on the first side of the mobile computing device; process a high-definition video stream of an area of interest, the high-definition video stream received via the connection with the wireless network; determine a perspective of the mobile computing device relative to an orientation of a video scene provided in the high-definition video stream; and output digital video on a display screen located on a second side of the mobile computing device, wherein the second side is opposite of the first side, wherein the output of the digital video includes a portion of the video scene of the high-definition video stream that is zoomed and panned to resemble the perspective of the mobile computing device.

In Example 19, the subject matter of Example 18 may include, further causing the mobile computing device to: process an image of the area of interest captured with the camera; detect a marker in the image of the area of interest; and correlate the marker in the area of interest to an orientation of the portion of the video scene.

In Example 20, the subject matter of any one of Examples 18 to 19 may include, wherein the marker is a machine-detectable marker, the machine-detectable marker including an infrared light or a machine-detectable object.

In Example 21, the subject matter of any one of Examples 18 to 20 may include, further causing the mobile computing device to: transmit location information of the mobile computing device to a remote video server; and receive the high-definition video stream from the remote video server in response to the location information, the high-definition video stream selected from a plurality of high-definition video streams.

In Example 22, the subject matter of any one of Examples 18 to 21 may include, wherein the location information of the mobile computing device includes wireless network information, the wireless network information including an SSID of a wireless access point for the wireless network.

In Example 23, the subject matter of any one of Examples 18 to 22 may include, wherein the location information of the mobile computing device includes an identifier read by the mobile computing device from a QR code, RFID tag, or Bluetooth Low Energy beacon.

In Example 24, the subject matter of any one of Examples 18 to 23 may include, wherein the instructions, when executed, further cause the mobile computing device to: detect and process a user gesture input to the mobile computing device; and change a displayed portion of the video scene of the high-definition video stream based on the user gesture input.

Example 25 includes subject matter (such as a method, means for performing acts, machine readable medium including instructions that when performed by a machine cause the machine to performs acts, or an apparatus to perform) for output of a virtual binoculars video display performed with operations of a processor and memory of a mobile computing device, comprising: receiving a selected stream of video data from a video streaming server via a wireless network; processing video content from the stream of the video data, wherein the selected stream of video data is selected based on a location of the mobile computing device in a viewing area located in proximity to a scene captured in the video data; and outputting a select enhanced portion of the video content, the select enhanced portion determined based on an orientation of the mobile computing device relative to the scene captured in the video data.

In Example 26, the subject matter of Example 25 may include, receiving user commands to effect control of the outputting of the select portion of the video content.

In Example 27, the subject matter of any one of Examples 25 to 26 may include, changing the select portion of the video content to be displayed based on at least one motion input detected by the mobile computing device.

In Example 28, the subject matter of any one of Examples 25 to 27 may include, receiving the stream of the video data via operation of the wireless network according to an IEEE 802.11 wireless network protocol, wherein the stream of the video data is selected based on a location of the mobile computing device relative to the scene, and wherein an identification of the location of the mobile computing device relative to an access point of the wireless network is communicated to the video streaming server to indicate the location of the mobile computing device.

In Example 29, the subject matter of any one of Examples 25 to 28 may include, correlating at least one indicator detected in the video content to the orientation of the mobile computing device relative to the scene captured in the video data.

In Example 30, the subject matter of any one of Examples 25 to 29 may include, capturing an image of at least a portion of the scene including the at least one indicator; processing the image of at least the portion of the scene including the at least one indicator to the select portion of the video content; and matching the image of at least the portion of the scene captured by the camera with an image of the scene captured in the video data, to determine the orientation of the mobile computing device relative to the scene.

Example 31 includes at least one machine-readable storage medium including instructions for streaming video at a mobile computing device, which when executed by a machine, cause the machine to perform any of the Examples 25-30.

Example 32 includes an apparatus comprising means for performing any of the Examples 25-30.

Example 33 includes subject matter (such as a device, apparatus, or machine) comprising: means for receiving a stream of video data from a video streaming server via a wireless network; means for processing video content from the stream of the video data, wherein the selected stream of video data is selected based on a location of the mobile computing device in a viewing area located in proximity to a scene captured in the video data; and means for outputting a select enhanced portion of the video content, the select enhanced portion determined based on an orientation of the mobile computing device relative to the scene captured in the video data.

In Example 34, the subject matter of Example 33 may include, means for receiving user commands to effect control of the output of the select enhanced portion of the video content on the display screen, wherein the select enhanced portion of the video content provides a zoomed and panned portion of the video content from the stream of the video data.

In Example 35, the subject matter of any one of Examples 33 to 34 may include, means for changing the select enhanced portion of the video content on the display screen based on at least one motion input detected by the mobile computing device.

In Example 36, the subject matter of any one of Examples 33 to 35 may include, receiving the stream of the video data via operation of the wireless network according to an IEEE 802.11 wireless network protocol, wherein the selected stream of the video data is selected based on a location of the mobile computing device relative to at least one access point of the wireless network located within the viewing area, and wherein an identification of the location of the mobile computing device relative to the access point of the wireless network is communicated to the video streaming server to indicate the location of the mobile computing device.

In Example 37, the subject matter of any one of Examples 33 to 36 may include, means for correlating at least one indicator detected in the video content to the orientation of the mobile computing device relative to the scene captured in the video data; means for capturing an image of at least a portion of the scene including the at least one indicator; means for processing the image of at least the portion of the scene including the at least one indicator to the select portion of the video content; and means for matching the image of at least the portion of the scene captured by the camera with an image of the scene captured in the video data, to determine the orientation of the mobile computing device relative to the scene.

Example 38 includes subject matter (such as a device, apparatus, or machine) for a mobile device comprising at least one processor to execute operations that: access a selected high-definition video stream, the high-definition video stream providing high-definition video of a scene captured in a direction of view away from the mobile device and towards an area of interest of the scene; correlate an orientation of the mobile device relative to the area of interest with a particular zoomed portion of the high-definition video of the scene; and display the particular zoomed portion of the high-definition video of the scene on the mobile device.

In Example 39, the subject matter of Example 38 may include, the at least one processor to further execute operations that: pan the high-definition video of the scene to the particular zoomed portion of the high-definition video, the panning performed using the orientation of the mobile device relative to the area of interest; and zoom the high-definition video of the scene to the particular zoomed portion of the high-definition video, the zooming performed using the orientation of the mobile device relative to the area of interest.

In Example 40, the subject matter of any one of Examples 38 to 39 may include, the at least one processor to further execute operations that: provide location information of the mobile device to a remote server, the location information indicating a location of the mobile device in an observation area adjacent to the scene; and receive the high-definition video stream from one of a plurality of high-definition video streams, the high-definition video stream selected by the remote server based the location information of the mobile device.

In Example 41, the subject matter of any one of Examples 38 to 40 may include, the at least one processor to further execute operations that: capture, with the mobile device, a digital image of the scene; detect, with the mobile device, a marker in the digital image of the scene; and select the particular zoomed portion of the high-definition video based on the position of the marker detected by the mobile device within the high-definition video of the scene, the particular zoomed portion of the high-definition video providing a subset of the larger high-definition video.

In Example 42, the subject matter of any one of Examples 38 to 41 may include, the at least one processor to further execute operations that: correlate the orientation of the mobile device to the particular zoomed portion of the high-definition video includes matching the marker in the digital image of the scene to a marker in an image of the high-definition video of the scene, to simulate a perspective of the scene from the mobile device in the selecting of the particular zoomed portion of the high-definition video.

In Example 43, the subject matter of any one of Examples 38 to 42 may include, wherein the marker is provided by at least one infrared light positioned in the scene.

In Example 44, the subject matter of any one of Examples 38 to 43 may include, wherein the marker is a machine-readable object positioned in the scene, the machine-readable object providing an identifier associated with a location relative to the scene.

In Example 45, the subject matter of any one of Examples 38 to 44 may include, the at least one processor to further execute operations that: capture, with the mobile device, a digital image of the scene; perform an image recognition of at least one object in the digital image of the scene; and select the particular zoomed portion of the high-definition video based on the correlation of the orientation of the mobile device to the particular zoomed portion of the high-definition video, the particular zoomed portion of the high-definition video providing a subset of the larger high-definition video.

In Example 46, the subject matter of any one of Examples 38 to 45 may include, the at least one processor to further execute operations that: display an information overlay on the particular zoomed portion of the high-definition video, the information overlay providing information about at least one real-world item portrayed in the particular zoomed portion of the high-definition video.

In Example 47, the subject matter of any one of Examples 38 to 46 may include, the at least one processor to further execute operations that: process at least one user input received in connection with a graphical user interface output with the mobile device, the at least one user input used to: select the high-definition video stream from among a plurality of high-definition video streams; perform panning of the high-definition video of the scene to another area of interest of the scene; or perform zooming of the high-definition video of the scene to generate a zoomed display of another portion of the area of interest of the scene.

Example 48 includes at least one machine-readable storage medium including instructions for streaming video at a mobile device, which when executed by a machine, cause the machine to perform any of the Examples 8-17.

Example 49 includes an apparatus comprising means for performing any of the Examples 8-17.

Example 50 includes subject matter (such as a device, apparatus, or machine) comprising: means for accessing a selected high-definition video stream at a mobile device, the high-definition video stream providing high-definition video of a scene captured in a direction of view away from the mobile device and towards an area of interest of the scene; means for correlating an orientation of the mobile device relative to the area of interest with a particular zoomed portion of the high-definition video of the scene; and means for displaying the particular zoomed portion of the high-definition video of the scene on the mobile device.

In Example 51, the subject matter of Example 50 may include, further comprising: means for panning the high-definition video of the scene to the particular zoomed portion of the high-definition video, the panning performed using the orientation of the mobile device relative to the area of interest; and means for zooming the high-definition video of the scene to the particular zoomed portion of the high-definition video, the zooming performed using the orientation of the mobile device relative to the area of interest.

In Example 52, the subject matter of any one of Examples 50 to 51 may include, further comprising: means for providing location information of the mobile device to a remote server, the location information indicating a location of the mobile device in an observation area adjacent to the scene; and means for receiving the high-definition video stream from one of a plurality of high-definition video streams, the high-definition video stream selected by the remote server based the location information of the mobile device.

In Example 53, the subject matter of any one of Examples 50 to 52 may include, further comprising: means for capturing a digital image of the scene; means for detecting a marker in the digital image of the scene; and means for selecting the particular zoomed portion of the high-definition video based on the position of the marker detected by the mobile device within the high-definition video of the scene, the particular zoomed portion of the high-definition video providing a subset of the larger high-definition video.

In Example 54, the subject matter of any one of Examples 50 to 53 may include, further comprising: means for correlating the orientation of the mobile device to the particular zoomed portion of the high-definition video includes matching the marker in the digital image of the scene to a marker in an image of the high-definition video of the scene, to simulate a perspective of the scene from the mobile device in the selecting of the particular zoomed portion of the high-definition video.

In Example 55, the subject matter of any one of Examples 50 to 54 may include, further comprising: means for detecting a marker is provided by at least one infrared light positioned in the scene.

In Example 56, the subject matter of any one of Examples 50 to 55 may include, further comprising: means for detecting the marker that is a machine-readable object positioned in the scene, the machine-readable object providing an identifier associated with a location relative to the scene.

In Example 57, the subject matter of any one of Examples 50 to 56 may include, further comprising: means for capturing a digital image of the scene; means for performing an image recognition of at least one object in the digital image of the scene; and means for selecting the particular zoomed portion of the high-definition video based on correlation of the orientation of the mobile device to the particular zoomed portion of the high-definition video, the particular zoomed portion of the high-definition video providing a subset of the larger high-definition video.

Example 58 includes subject matter (such as a method, means for performing acts, machine readable medium including instructions that when performed by a machine cause the machine to performs acts, or an apparatus to perform) performed by at least one processor of a mobile computing device, the subject matter comprising: establishing a connection with a wireless network; capturing a digital image with a camera located on a first side of the mobile computing device, the digital image captured from a perspective of the first side; processing a high-definition video stream of an area of interest, the high-definition video stream received via the connection with the wireless network; determining a perspective of the mobile computing device relative to an orientation of a video scene provided in the high-definition video stream; and outputting digital video on a display screen located on a second side of the mobile computing device, wherein the second side is opposite of the first side, the outputting including outputting a lower-resolution portion of the high-definition video stream with the display screen, the video scene of the high-definition video stream being zoomed and panned to the lower-resolution portion to resemble the perspective of the mobile computing device.

In Example 59, the subject matter of Example 58 may include, further comprising: processing an image of the area of interest captured with the camera; detecting a marker in the image of the area of interest; and correlating the marker in the area of interest to an orientation of the portion of the video scene.

In Example 60, the subject matter of any one of Examples 58 to 59 may include, wherein the marker is a machine-detectable marker, the machine-detectable marker including an infrared light or a machine-detectable object.

In Example 61, the subject matter of any one of Examples 58 to 60 may include, further comprising: transmitting location information of the mobile computing device to a remote video server; and receiving the high-definition video stream from the remote video server in response to the location information, the high-definition video stream selected from a plurality of high-definition video streams.

In Example 62, the subject matter of any one of Examples 58 to 61 may include, wherein the location information of the mobile computing device includes wireless network information, the wireless network information including an SSID of a wireless access point for the wireless network.

In Example 63, the subject matter of any one of Examples 58 to 62 may include, wherein the location information of the mobile computing device includes an identifier read by the mobile computing device from a QR code, RFID tag, or Bluetooth Low Energy beacon.

In Example 64, the subject matter of any one of Examples 58 to 63 may include, further comprising: detecting and processing a user gesture input to the mobile computing device; and changing a displayed portion of the video scene of the high-definition video stream based on the user gesture input.

Example 65 includes an apparatus comprising means for performing any of the Examples 58-64.

Example 66 includes subject matter (such as a device, apparatus, or machine) for a mobile computing device comprising: at least one processor; a wireless transceiver, the wireless transceiver establishing a connection with at least one wireless network; a camera located on a first side of the mobile computing device, the camera capturing a digital image from a perspective of the first side; a display screen located on a second side of the mobile computing device, the display screen outputting digital video, wherein the second side is opposite of the first side; and at least one memory including instructions, the instructions operable for execution with the at least one processor, and the instructions, when executed, causing the mobile computing device to: process a high-definition video stream of an area of interest, the high-definition video stream received via the wireless transceiver; determine a perspective of the mobile computing device relative to an orientation of a video scene provided in the high-definition video stream; and output a lower-resolution portion of the high-definition video stream with the display screen, the video scene of the high-definition video stream being zoomed and panned to the lower-resolution portion to resemble the perspective of the mobile computing device.

In Example 67, the subject matter of Example 66 may include, the memory further including instructions that, when executed, cause the mobile computing device to: process an image of the area of interest captured with the camera; detect a marker in the image of the area of interest; and correlate the marker in the area of interest to an orientation of the portion of the video scene.

In Example 68, the subject matter of any one of Examples 66 to 67 may include, wherein the marker is a machine-detectable marker, the machine-detectable marker including an infrared light or a machine-detectable object.

In Example 69, the subject matter of any one of Examples 66 to 68 may include, the memory further including instructions that, when executed, cause the mobile computing device to: transmit location information of the mobile computing device to a remote video server; and receive the high-definition video stream from the remote video server in response to the location information, the high-definition video stream selected from a plurality of high-definition video streams.

In Example 70, the subject matter of any one of Examples 66 to 69 may include, wherein the location information of the mobile computing device includes wireless network information from the wireless transceiver, the wireless network information including an SSID of a wireless access point.

In Example 71, the subject matter of any one of Examples 66 to 70 may include, wherein the location information of the mobile computing device includes an identifier read by the mobile computing device from a QR code, RFID tag, or Bluetooth Low Energy beacon.

In Example 72, the subject matter of any one of Examples 66 to 71 may include, the memory further including instructions that, when executed, cause the mobile computing device to: detect and process a user gesture input to the mobile computing device; and change a displayed portion of the video scene of the high-definition video stream based on the user gesture input.

Example 73 includes subject matter (such as a device, apparatus, or machine) for a video streaming server serving video content to a mobile computing device comprising: a video processing module to obtain video from a plurality of high definition video cameras; a location processing module to obtain a location of the mobile computing device relative to the plurality of high definition video cameras; a video content module to process video content from the plurality of high definition video cameras; and a video stream transmission module to provide a plurality of video streams to respective mobile computing devices, the plurality of video streams including a high-definition video stream provided to the mobile computing device.

In Example 74, the subject matter of Example 73 may include, wherein the video streaming server to communicate of the plurality of video streams via wireless access points, the wireless access points communicating according to an IEEE 802.11 standard protocol.

In Example 75, the subject matter of any one of Examples 73 to 74 may include, wherein the video streaming server is to communicate with a camera control server, the camera control server providing repositioning and control of respective cameras of the plurality of high definition video cameras.

In Example 76, the subject matter of any one of Examples 73 to 75 may include, wherein the video streaming server is to communicate with an administration device, the administration device providing monitoring and control of video streaming usage and video streaming server operations.

Example 77 includes subject matter (such as a method, means for performing acts, machine readable medium including instructions that when performed by a machine cause the machine to performs acts, or an apparatus to perform) for a method of streaming video from a streaming server to a mobile computing device comprising: processing video content obtained from a plurality of high-definition video cameras of an area of interest; obtaining a location of the mobile computing device relative to at least one of the plurality of high-definition video cameras and the area of interest; and transmitting a high-definition video stream of the video content to the mobile computing device via a wireless network; wherein a display of the video content is customized at the mobile computing device based on the location of the mobile computing device within a defined observing area proximate to the camera and proximate to the area of interest.

In Example 78, the subject matter of Example 77 may include, further comprising: repositioning and controlling the respective cameras of the plurality of high definition video cameras.

In Example 79, the subject matter of any one of Examples 77 to 78 may include, wherein the high-definition video stream of the video content is transmitted to the mobile computing device as part of a multicast of high-definition video content to a plurality of mobile computing devices, wherein each of the mobile computing devices provides a custom perspective of the display of the high-definition video stream based on the location of a respective mobile computing device relative to the area of interest.

In Example 80, the subject matter of any one of Examples 77 to 79 may include, further comprising: monitoring video streaming usage and video streaming server operations for the high-definition video stream.

Example 81 includes at least one machine-readable storage medium including instructions for serving mobile video content to a mobile computing device, which when executed by a machine, cause the machine to perform any of the Examples 77-80.

Example 82 includes an apparatus comprising means for performing any of the Examples 77-80.

Example 83 includes subject matter (such as a device, apparatus, or machine) comprising: means for processing video content obtained from a plurality of high-definition video cameras of an area of interest; means for obtaining a location of a mobile computing device relative to at least one of the plurality of high-definition video cameras and the area of interest; and means for transmitting a high-definition video stream of the video content to the mobile computing device via a wireless network; wherein a display of the video content is customized at the mobile computing device based on the location of the mobile computing device within a defined observing area proximate to the high-definition video cameras and proximate to the area of interest.

In Example 84, the subject matter of Example 83 may include, means for repositioning and controlling the respective cameras of the plurality of high definition video cameras.

In Example 85, the subject matter of any one of Examples 83 to 84 may include, further comprising: means for transmitting the high-definition video stream of the video content to the mobile computing device as part of a multicast of high-definition video content to a plurality of mobile computing devices, wherein each of the mobile computing devices provides a custom perspective of the display of the high-definition video stream based on the location of a respective mobile computing device relative to an area of interest.

In Example 86, the subject matter of any one of Examples 83 to 85 may include, further comprising: means for monitoring video streaming usage and video streaming server operations.

Example 87 includes subject matter (such as a device, apparatus, or machine) comprising: a plurality of high definition video cameras; a video streaming server, the video streaming server to provide respective streams of high-definition video from the plurality of high definition video cameras; and a plurality of access points establishing a coverage area for a wireless network, the plurality of access points to wirelessly transmit data for the streams of the plurality of high definition video cameras relative to locations of respective mobile devices within the coverage area for the wireless network.

In Example 88, the subject matter of Example 87 may include, further comprising: a plurality of markers, wherein the plurality of markers are detectable by the respective mobile devices to determine a location of the mobile device relative to an area of interest captured by the plurality of high definition video cameras.

In Example 89, the subject matter of any one of Examples 87 to 88 may include, wherein the plurality of markers are infrared markers, wherein the infrared markers provide indications for the respective mobile devices to enable a selection of a particular stream of the plurality of high definition video cameras based on visibility of the infrared markers to the mobile devices.

In Example 90, the subject matter of any one of Examples 87 to 89 may include, further comprising: the respective mobile devices, the mobile devices to output selected portions the respective streams of the plurality of high definition video cameras relative to the locations of the mobile devices and the infrared markers.

In Example 91, the subject matter of any one of Examples 87 to 90 may include, wherein the plurality of access points operate with an IEEE 802.11 wireless network standard.

In Example 92, the subject matter of Example 8 may include, determining a perspective of the mobile device relative to an orientation of the high-definition video of the scene; and generating digital video output for a display screen of the mobile device, wherein the output of the digital video includes the particular portion of the high-definition video of the scene that is zoomed and panned to resemble the perspective of the mobile device.

In Example 93, the subject matter of any one of Examples 8 or 92 may include, capturing a digital image from a perspective of a first side of the mobile device, using a camera located on the first side of the mobile device, wherein the first side of the mobile device is opposite a second side of the mobile device, and wherein the display screen is located on the second side of the mobile device; processing an image of the area of interest captured with the camera; detecting a marker in the image of the area of interest; and correlating the marker in the area of interest to an orientation of the portion of the video scene.

In Example 94, the subject matter of any one of Examples 8 or 92 to 93 may include, wherein the marker is a machine-detectable marker, the machine-detectable marker including an infrared light or a machine-detectable object.

In Example 95, the subject matter of any one of Examples 8 or 92 to 94 may include, establishing a connection with a wireless network; transmitting location information of the mobile device to a remote video server via the connection with the wireless network; and receiving the high-definition video stream from the remote video server via the connection with the wireless network in response to the location information, the high-definition video stream selected from a plurality of high-definition video streams.

In Example 96, the subject matter of any one of Examples 8 or 92 to 95 may include, wherein the location information of the mobile device includes wireless network information, the wireless network information including an SSID of a wireless access point for the wireless network.

In Example 97, the subject matter of any one of Examples 8 or 92 to 96 may include, wherein the location information of the mobile device includes an identifier read by the mobile device from a QR code, RFID tag, or Bluetooth Low Energy beacon.

In Example 98, the subject matter may include, at least one machine-readable storage medium including instructions, which when executed by a machine, cause the machine to perform any of Examples 92-97.

In Example 99, the subject matter may include, an apparatus comprising means for performing any of Examples 92-97.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A mobile computing device to provide a virtual binocular display, the mobile computing device comprising:
   a wireless networking transceiver to receive a selected stream of video data from a video streaming server via a wireless network;
   a processor to process video content from the stream of the video data, wherein the selected stream of video data is selected based on a location of the mobile computing device in a viewing area located in proximity to a scene captured in the video data;
   a display processor to output a select enhanced portion of the video content on a display screen of the mobile computing device, the select enhanced portion determined based on an orientation of the mobile computing device relative to the scene captured in the video data; and
   a camera to capture a digital image of the scene;
   wherein operations performed by the processor to process the video content from the stream of the video data include operations to:
      perform image recognition of at least one object in the digital image of the scene; and
      identify the select enhanced portion of the video content based on a location of the at least one object in the select enhanced portion of the high-definition video.

2. The mobile computing device of claim 1, wherein the processor operates to generate a graphical user interface, the graphical user interface to receive user commands to effect control of the output of the select enhanced portion of the video content on the display screen, wherein the select enhanced portion of the video content provides a zoomed and panned portion of the video content from the stream of the video data.

3. The mobile computing device of claim 1, wherein the processor operates to change the select enhanced portion of the video content on the display screen based on at least one motion input detected by the mobile computing device.

4. The mobile computing device of claim 1, wherein the wireless networking transceiver operates to receive the stream of the video data via operation of the wireless network according to an IEEE 802.11 wireless network protocol, wherein the selected stream of the video data is selected based on a location of the mobile computing device relative to at least one access point of the wireless network located within the viewing area, and wherein an identification of the location of the mobile computing device relative to the access point of the wireless network is communicated to the video streaming server to indicate the location of the mobile computing device.

5. The mobile computing device of claim 1, wherein the at least one object includes at least one indicator, and wherein the processor operates to correlate the at least one indicator detected in the digital image of the scene to the orientation of the mobile computing device relative to the scene captured in the video data, based on the location of the at least one object in the select enhanced portion of the high-definition video.

6. The mobile computing device of claim 5, wherein the processor operates to correlate the digital image of at least the portion of the scene including the at least one indicator to the select enhanced portion of the video content.

7. The mobile computing device of claim 6, wherein the processor operates to compare and match the digital image of at least the portion of the scene captured by the camera with an image of the scene captured in the video data, to determine the orientation of the mobile computing device relative to the scene.

8. A method of displaying streaming video at a mobile device, the method comprising operations executing with hardware components at the mobile device, the operations including:
   capturing, with the mobile device, a digital image of a scene;
   performing an image recognition of at least one object in the digital image of the scene;
   accessing a selected high-definition video stream at the mobile device, the high-definition video stream providing high-definition video of the scene captured in a direction of view away from the mobile device and towards an area of interest of the scene;
   determining an orientation of the mobile device relative to the area of interest, based on the at least one object;
   selecting a particular zoomed portion of the high-definition video based on determining the orientation of the mobile device relative to the area of interest, the particular zoomed portion of the high-definition video providing a reduced area within the high-definition video; and displaying the particular zoomed portion of the high-definition video of the scene on the mobile device.

9. The method of claim 8, further comprising:
panning the high-definition video of the scene to the particular zoomed portion of the high-definition video, the panning performed using the orientation of the mobile device relative to the area of interest; and
zooming the high-definition video of the scene to the particular zoomed portion of the high-definition video, the zooming performed using the orientation of the mobile device relative to the area of interest.

10. The method of claim 8, further comprising:
providing location information of the mobile device to a remote server, the location information indicating a location of the mobile device in an observation area adjacent to the scene; and
receiving the high-definition video stream from one of a plurality of high-definition video streams, the high-definition video stream selected by the remote server based the location information of the mobile device.

11. The method of claim 8, wherein the at least one object is a marker, and the method further comprising:
detecting, with the mobile device, the marker in the digital image of the scene; and
wherein the particular zoomed portion of the high-definition video is further selected based on a position of the marker detected by the mobile device within the high-definition video of the scene.

12. The method of claim 11, wherein correlating the orientation of the mobile device to the particular zoomed portion of the high-definition video includes matching the marker in the digital image of the scene to a marker in an image of the high-definition video of the scene, to simulate a perspective of the scene from the mobile device in the selecting of the particular zoomed portion of the high-definition video.

13. The method of claim 12, wherein the marker is provided by at least one infrared light positioned in the scene.

14. The method of claim 12, wherein the marker is a machine-readable object positioned in the scene, the machine-readable object providing an identifier associated with a location relative to the scene.

15. The method of claim 8, further comprising:
displaying an information overlay on the particular zoomed portion of the high-definition video, the information overlay providing information about at least one real-world item portrayed in the particular zoomed portion of the high-definition video.

16. The method of claim 8, further comprising:
processing at least one user input received in connection with a graphical user interface output with the mobile device, the at least one user input used to:
select the high-definition video stream from among a plurality of high-definition video streams;
perform panning of the high-definition video of the scene to another area of interest of the scene;
or perform zooming of the high-definition video of the scene to generate a zoomed display of another portion of the area of interest of the scene.

17. At least one machine-readable storage medium including instructions for outputting a video display on a mobile computing device, comprising instructions, that when executed, cause the mobile computing device to:
establish a connection with a wireless network;
capture a digital image of an area of interest from a perspective of a first side of the mobile computing device, using a camera located on the first side of the mobile computing device;
perform an image recognition of at least one object in the digital image;
process a high-definition video stream of the area of interest, the high-definition video stream received via the connection with the wireless network;
determine a perspective of the mobile computing device relative to an orientation of a video scene provided in the high-definition video stream based upon a correlation of the at least one object in the digital image with a representation of the at least one object in the high-definition video stream;
select a portion of the video scene of the high-definition video stream based upon the determined perspective of the mobile computing device; and
output digital video on a display screen located on a second side of the mobile computing device, wherein the second side is opposite of the first side, wherein the output of the digital video includes the portion of the video scene of the high-definition video stream, and wherein the portion of the video scene of the high-definition video stream is zoomed and panned to resemble the perspective of the mobile computing device.

18. The machine-readable storage medium of claim 17, wherein the at least one object is a marker, and wherein the instructions, when executed, further cause the mobile computing device to:
process the digital image of the area of interest captured with the camera;
detect the marker in the image of the area of interest; and
correlate the marker in the area of interest to an orientation of the portion of the video scene.

19. The machine-readable storage medium of claim 18, wherein the marker is a machine-detectable marker, the machine-detectable marker including an infrared light or a machine-detectable object.

20. The machine-readable storage medium of claim 17, wherein the instructions, when executed, further cause the mobile computing device to:
transmit location information of the mobile computing device to a remote video server; and
receive the high-definition video stream from the remote video server in response to the location information, the high-definition video stream selected from a plurality of high-definition video streams.

21. The machine-readable storage medium of claim 20, wherein the location information of the mobile computing device includes wireless network information, the wireless network information including an SSID of a wireless access point for the wireless network.

22. The machine-readable storage medium of claim 20, wherein the location information of the mobile computing device includes an identifier read by the mobile computing device from a QR code, RFID tag, or Bluetooth Low Energy beacon.

23. The machine-readable storage medium of claim 17, wherein the instructions, when executed, further cause the mobile computing device to:
detect and process a user gesture input to the mobile computing device; and change a displayed portion of the video scene of the high-definition video stream based on the user gesture input.

\* \* \* \* \*